Figure 1:
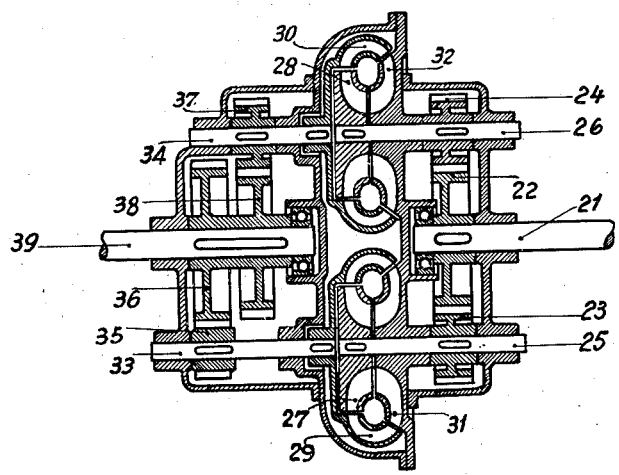

Dec. 8, 1936.   C. STEDEFELD   2,063,471
MULTISTAGE HYDRAULIC COUPLING
Filed Jan. 23, 1933   7 Sheets-Sheet 1

Inventor:
Curt Stedefeld,
By Byrnes Donmund + Potter,
Attorneys.

Dec. 8, 1936.   C. STEDEFELD   2,063,471
MULTISTAGE HYDRAULIC COUPLING
Filed Jan. 23, 1933   7 Sheets-Sheet 2

Inventor:
Curt Stedefeld,
By Byrnes, Townsend & Potter,
Attorneys.

Dec. 8, 1936.     C. STEDEFELD     2,063,471
MULTISTAGE HYDRAULIC COUPLING
Filed Jan. 23, 1933    7 Sheets-Sheet 4

Inventor:
Curt Stedefeld,
By Byrnes, Townsend & Potter,
Attorneys.

Dec. 8, 1936.  C. STEDEFELD  2,063,471
MULTISTAGE HYDRAULIC COUPLING
Filed Jan. 23, 1933   7 Sheets-Sheet 5

Inventor:
Curt Stedefeld,
By Byrnes, Townsend & Potter,
Attorneys.

Dec. 8, 1936.                C. STEDEFELD                2,063,471
                      MULTISTAGE HYDRAULIC COUPLING
                  Filed Jan. 23, 1933        7 Sheets-Sheet 6
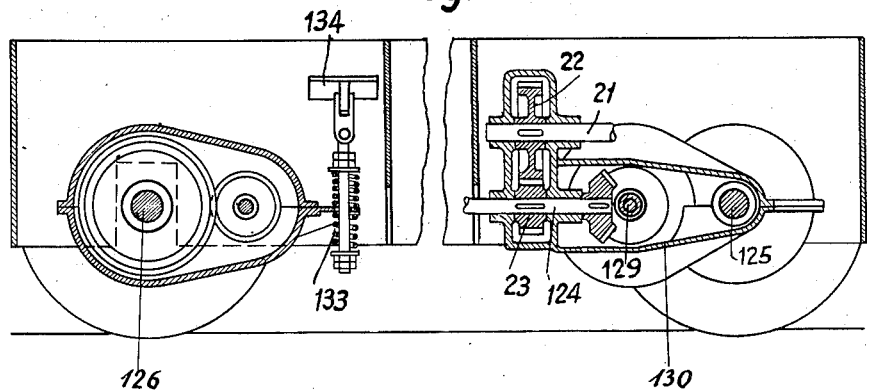
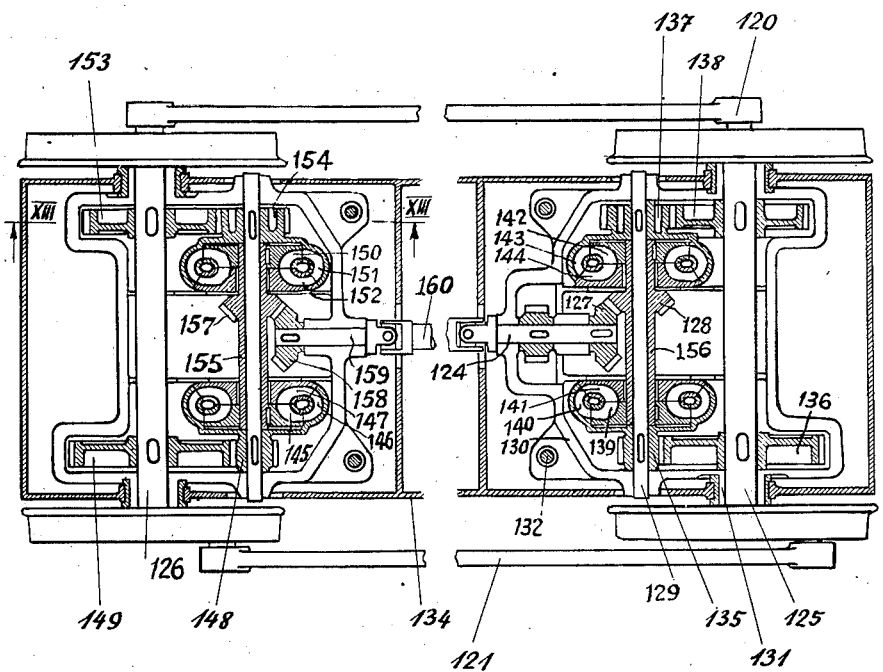

Dec. 8, 1936.   C. STEDEFELD   2,063,471
MULTISTAGE HYDRAULIC COUPLING
Filed Jan. 23, 1933   7 Sheets-Sheet 7

Patented Dec. 8, 1936

2,063,471

UNITED STATES PATENT OFFICE 2,063,471

MULTISTAGE HYDRAULIC COUPLING

Curt Stedefeld, Hannover, Germany

Application January 23, 1933, Serial No. 653,204
In Germany February 1, 1932

14 Claims. (Cl. 74—330)

In land vehicles such as motor vehicles, self propelled railway coaches, locomotives and so forth, driven by engines whose torque can be increased but moderately or not at all, it is usual to obtain the necessary increased tractive effort for starting, hills and so forth by means of change speed gears between the motor and the driving axle or axles. Toothed wheel change speed gears are very desirable on account of their low losses and their reasonable cost and weight, but undesirable on account of the inconvenience of changing gear and the interruption in tractive effort during such changes. Electrical power transmission on the contrary involves considerable losses, high cost and heavy weight, but gives very convenient control without considerable steps or sharp changes in tractive effort. Between the two are hydraulic gears which have not it is true come into use in the form of piston and like gears, but in the form of turbo-gears (the so-called transformers of Föttinger) which have opened up a far reaching parallel to electrical transmission. But they have only been used on vehicles in a manner but little differing from that used in ships, either as a two part turbo coupling without fixed vanes in place of the usual engine friction clutch, followed by a toothed wheel change speed gear, or in place of all clutches and other change speed gears as a continuously variable self-regulating change speed gear having fixed guide vanes, over the whole range. Where a single transformer appeared to give too low efficiency over the whole speed range, several transformers of different ranges have been provided only one of which is in operation at a time.

In contradistinction to these schemes, in the present invention the best features of the toothed wheel change speed gear and the best features of the Föttinger transformer are combined into a compound gear, which has all the good features of electrical transmission, but is lighter and cheaper and has fewer possible sources of faults. To this end single or multistage Föttinger transformers having stationary guide vanes, which automatically regulate their ratio over a large range with high efficiency are so arranged in series with toothed wheel gears that the power always passes through both in series while the individual gear ratios can be selected by filling and emptying of the transformers. By the use of transformers with fixed guide vanes, in particular those in which the order of flow is primary wheel, secondary wheel, stationary vanes, in spite of quite a low number (generally two) of gears, changes can be made practically without sudden changes in the tractive effort.

Figure 2:
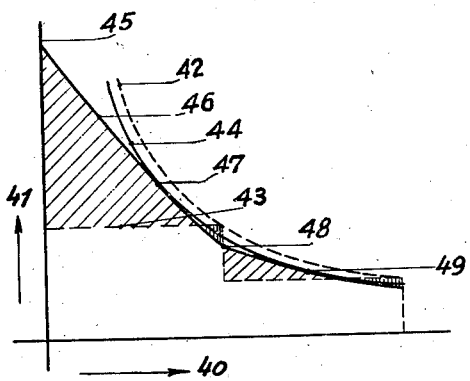
Figure 11:
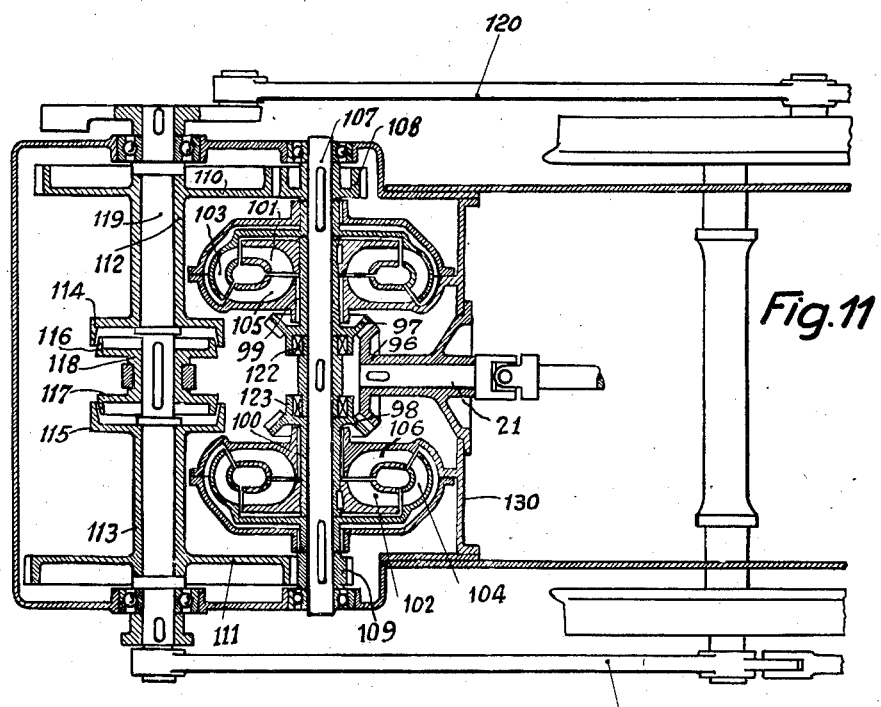
Figure 14:
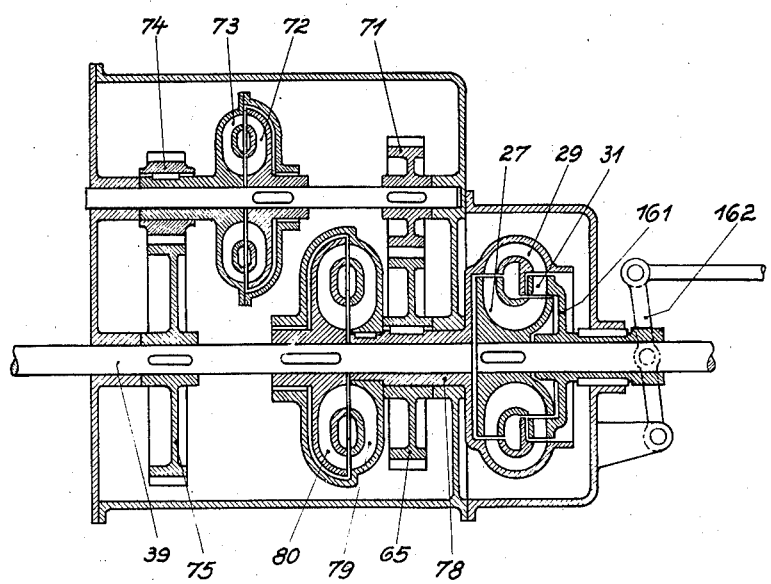
Figure 15:
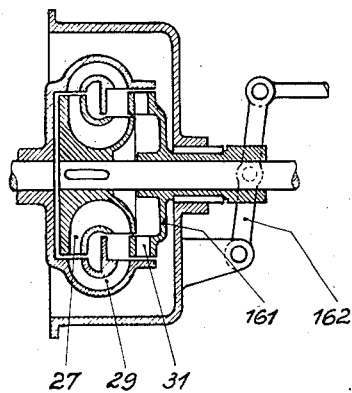

Typical embodiments of the invention are described in the following specification and shown in the accompanying drawings, in which, Fig. 1 is a central section through one novel form of multiple speed gearing, Fig. 2 is a curve sheet showing the relation between torque or tractive effort and speed, Figs. 3 to 10 are longitudinal sections illustrating other forms of multiple speed gearing, Fig. 11 is a fragmentary sectional view of a locomotive driven through a multiple speed gear mechanism including free wheel clutches, Fig. 12 is a fragmentary vertical section of a locomotive truck, the left side of the view being taken on line XIII—XIII of Fig. 13, Fig. 13 is a horizontal section through the truck shown in Fig. 12, Fig. 14 is a section through a multiple speed gearing which includes a Föttinger transformer having an adjustable set of guide vanes, and Fig. 15 is a fragmentary sectional view illustrating another position of the adjustable guide vanes of the Fig. 14 gearing.

Figure 1 of the accompanying drawings shows such a multi-speed transmission gear in section. The motor driven shaft 21 through the toothed wheel 22 drives the toothed wheels 23 and 24 on the shafts 25 and 26 respectively and thereby the primary wheels 27 and 28 thereon of two Föttinger transformers. By means of a small continuously running pump not shown and pipe connections controlled from the driver's place, either of the two transformers can be supplied with working fluid (e. g. water or oil). In the illustrated example the circuit 27, 29, 31 is filled for starting. Accordingly the liquid stream pumped by the primary wheel 27 drives the secondary wheel 29 as a turbine, while the fixed ring of guide vanes 31 continuously returns the liquid to the pump inlet 27. The secondary wheel 29 drives the shaft 39 leading to the driving axle through the shaft 33 and the high ratio reduction gears 35, 36. For the second gear at higher speeds the first transformer 27, 29, 31 is emptied and the second 28, 30, 32 filled, which drives the shaft 39 through the shaft 34 and reduction gear 37, 38, faster than through the first gear at the same motor speed. The final drive to the driving axle from the shaft 39 is to be assumed as of known kind, for example through bevel gears. Reversal may here be provided for, for example by the known bevel reverse gear.

It will be seen that the toothed wheels of both gears run in constant mesh. Of the two transformers only one is filled at a time while the other runs empty. This empty running involves practically negligible power loss, because in the first place the primary and secondary parts of the empty transformer run in the same direction and only pass at the speed difference between the two gears. But in addition the combination of the transformers with toothed gears makes it possible to design the transformers without reference to the desired overall ratio but most suitably from other points of view say for low windage losses, especially for high efficiency, for saving of space, weight and cost and not least for considerable torque increase in the secondary part with considerable slip. In other words the transformer is designed only for such a ratio as will give efficiency from these points of view, while the toothed gearing with its very high efficiency will give the desired further change of speed. Since any overall ratio of the reduction produced in this way can be obtained without difficulty the primary side of the transformer can even be geared up from the motor in order to obtain a small light and cheap transformer. This is shown in Figure 1 by the gearing 22, 23, 24.

An important advantage of this arrangement is that with a type of transformer having satisfactory efficiency over a considerable ratio range, an almost continuous variation of torque or tractive effort without jumps or gaps can be provided over the full range from standstill to full speed of the vehicle with very few—generally two gears. This will be explained with reference to the tractive effort diagram in Figure 2. The horizontal axis 40 indicates speeds, and the vertical axis 41 tractive effort both rising in the direction of the arrow. An ideally varying gear with constant highest possible efficiency would operate so that with full motor output, at every vehicle speed, the product of tractive effort and speed equals the product of motor output and efficiency which is constant, and is represented by the uppermost hyperbola 42. If however a toothed wheel change speed gear with two ratios were coupled to a motor which for simplicity will be assumed to give a constant torque at all speeds, a torque diagram like the stepped line 43 would be obtained; this only touches the highest hyperbola 42 at two points and except at these points lies more or less below it. If now according to the invention, Föttinger transformers with fixed vanes are interposed in such a two step gear, it is true the highest efficiency attainable assumed for the hyperbola 42 will be lowered to 44 owing to transformer losses. But while the vehicle is at a standstill the motor can be brought up to full speed and output and a manifold torque increase obtained, point 45 by the impulsive flow against the secondary wheel. With increasing vehicle speed the tractive effort then follows the line 46 without jumps, over the point 47 of the highest efficiency of the first gear, to the change over point 48 to the second gear, and to the point 49 of the highest efficiency. The large diagonally hatched areas represent the gain in tractive effort over the plain toothed wheel two speed gear, against which only the small vertically hatched areas of loss must be set off. This much greater tractive effort for starting acceleration and for manoeuvring acceleration at high speed, will be recognized, both of which are of great importance for obtaining high journey speeds.

Figure 3:
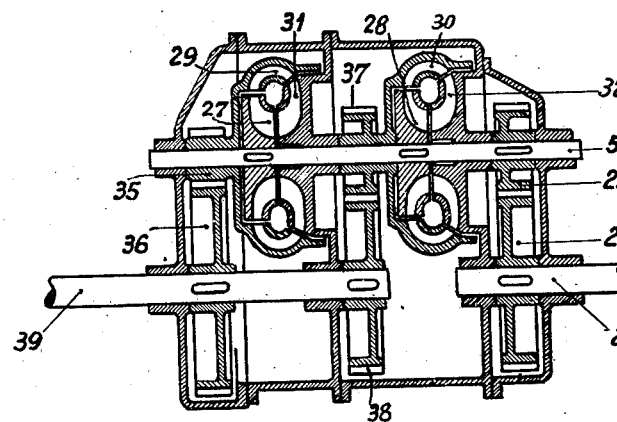

In contradistinction to Figure 1, in Figure 3 (mid-section) both transformers 27, 29, 31 and 28, 30, 32, again of a two speed gear, are mounted upon the same shaft 50, which here again is geared up through train 22, 23 from the motor driven shaft 21. This arrangement on a common primary shaft 50 is made possible by the toothed gear belonging to each transformer being fast to its secondary part; in the first gear the wheel 35 on the secondary part 29 drives the wheel 36 on the shaft 39 leading to the driving axle; in the second gear the wheel 37 on the secondary part 30 drives the wheel 38 on shaft 39.

Figure 4:
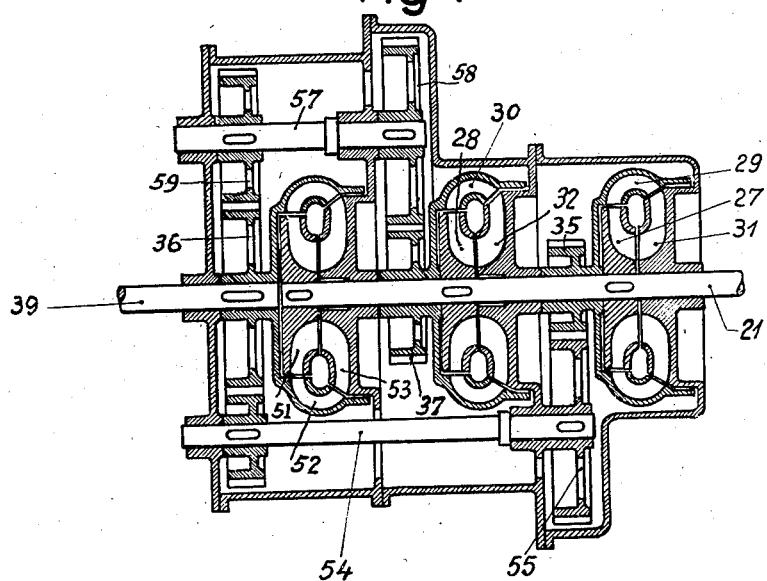

In Figure 4 (mid-section) a three speed gear on the same principle is illustrated, but here in one gear the motor driven shaft 21 drives the shaft 39 leading to the driving axle through the transformer 51, 52, 53 without the interposition of a toothed wheel train. Suitable choice of the final ratio from the shaft 39 to the driving axle will often allow this simplification of the top gear. The other two gears operate on the same principle as Figure 3; in the first gear the transformer 27, 29, 31 through the adjacent pinion 35 drives a counter-shaft 54 bearing the wheels 55 and 56 the latter meshing with the wheel 36 on the shaft 39; in the second gear the transformer 28, 30, 32 through the pinion 37 and counter-shaft 57 with the wheels 58, 59 also drives the shaft 39, through the wheel 36.

Figure 5:
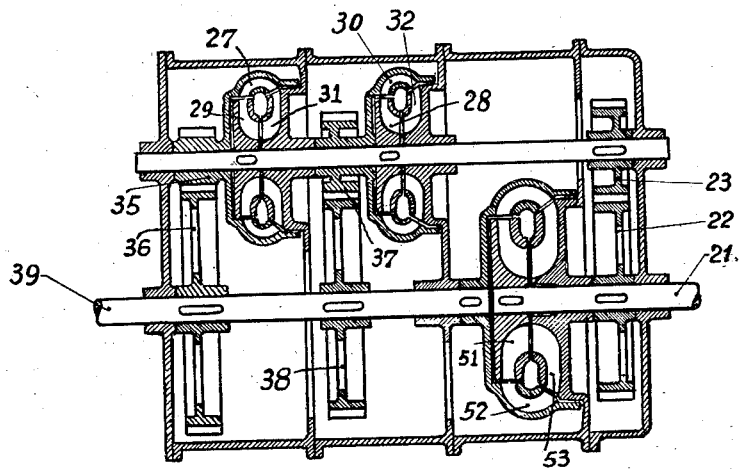

In Figure 5 (mid-section) is shown how a direct gear from the motor driven shaft 21 to the shaft 39 by the transformer 51, 52, 53 can be combined with toothed wheel and transformer gears of particularly small, light and cheap construction, the latter transformers being again speeded up through a gear train 22, 23. The starting gear is here formed by transformer 27, 29, 31 and wheels 35 and 36, the middle gear by the transformer 28, 30, 32 and wheels 37 and 38.

Figure 6:
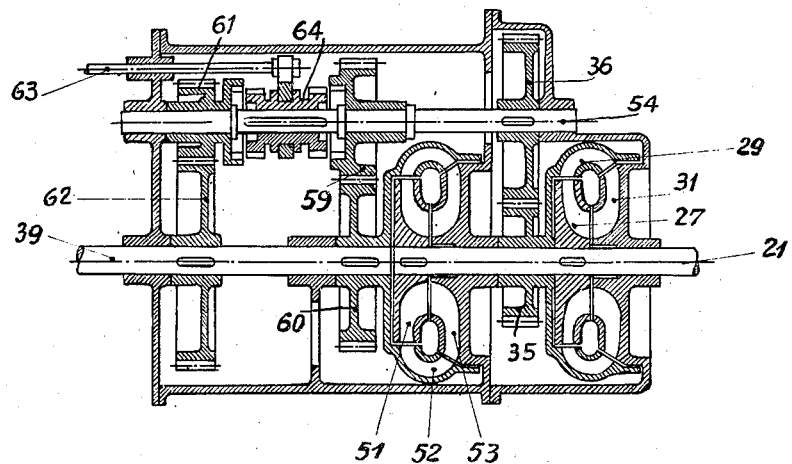

In addition to the combination according to the invention of Föttinger transformers with toothed wheel trains to form change speed gears, further mechanically clutchable sub-gears can be provided for special conditions, as shown in Figure 6 (mid-section) by way of example for a vehicle which has to travel sometimes with and sometimes without a heavy trailer. In the latter case considerably greater tractive effort for starting and manoeuvring is required than when there is no trailer. Accordingly in Figure 6 the starting gear consists of a Föttinger transformer 27, 29, 31 driven from the motor through shaft 21, behind which a wheel train with two selectable different ratios is provided; the secondary part 29 through the wheels 35 and 36 drives the countershaft 54 which can drive the shaft 39 leading to the driving axle through either of two wheel pairs 59, 60, and 61, 62. Either wheel 59 or wheel 61 can be coupled in known manner to the shaft 54 by clutch 64 controllable by the rod 63. For travel without the trailer the clutch is meshed with wheel 59, and with the trailer meshed with wheel 61. The full speed gear here again consists of a transformer 51, 52, 53 which works directly from shaft 21 to shaft 39.

Figure 7:
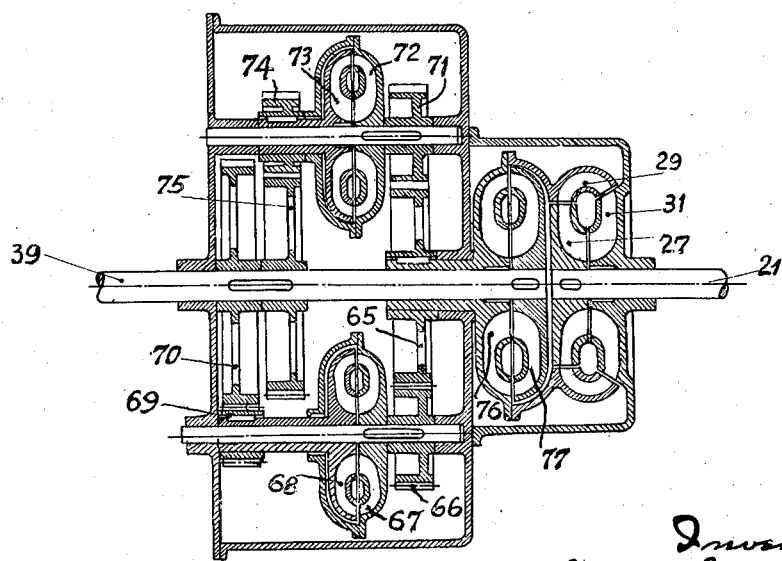

The principles of the invention can also be put into practice by interposing only a single torque increasing Föttinger transformer having fixed guide vanes, in front of all gears and effecting the connection at will of the individual gears thereto through a clutch of any desired known type, in each gear. An example of a three speed gear having clutches in the form of Föttinger couplings without fixed vanes is shown in Figure 7 (mid-section). Here the motor driven shaft 21 drives a torque increasing Föttinger transformer 27, 29, 31. The secondary part thereof is connected to three different Föttinger couplings without fixed vanes; firstly through wheels 65, 66 to the coupling half 67 which through the other half 68 and wheels 69/70 drives the shaft 39; secondly through wheels 65, 71 to coupling 72, 73, which drives shaft 39 through wheels 74, 75; thirdly directly to the coupling half 76 of which coacting half 77 is fast on the shaft 39 itself. The torque increasing transformer 27, 29, 31 having fixed guide vanes remains constantly filled. Of the three Föttinger couplings 67, 68 is filled for starting, then 72, 73 and finally 76, 77 so that the torque increasing transformer always works in series with one of the three couplings.

Figure 8:
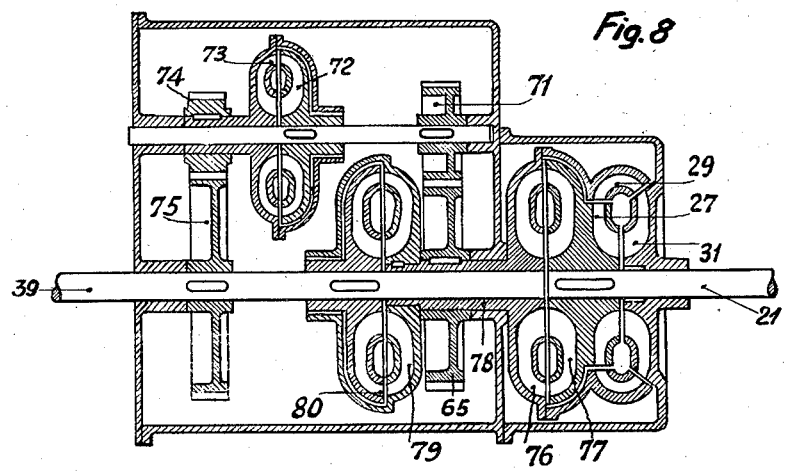

If it is desired still to use the torque increasing transformer with fixed vanes interposed in front of the gears to bridge over between them, but to replace it during travel at a speed near that of the gear ratio in use by a Föttinger coupling of greater efficiency, this can be effected with the gear arrangement of Figure 8 (midsection). Here the pump wheel 27 of the torque increasing transformer 27, 29, 31 with fixed vanes, and the primary wheel 77 of the hydraulic coupling 76, 77 are both fast on the motor driven shaft 21. The turbine wheel 29 as in Figure 7 is rigidly connected with the secondary part 76 of the coupling. But in contradistinction to Figure 7 the hollow shaft 78 of the secondary wheel 76, in addition to the gear wheel 65, carries the coupling half 79 which with the half 80 on the shaft 39 forms a further coupling. Only a single toothed wheel gear is shown in Figure 7, but this is in no way an essential limitation. The shaft 39 as in Figure 7, can be driven either through the gearing 65, 71, 74, 75 or directly from the shaft 21 according to whether the coupling 72, 73 or 79, 80 is filled. At the same time the gear can be coupled either through the transformer 27, 29, 31 or the coupling 76, 77, the transformer being used in starting and manoeuvring, and the couplings 76, 77 when long distances of uniform resistance have to be covered. In this case the efficiency of transmission is substantially higher than when only a torque increasing transformer according to Figure 7 is provided in advance of the toothed wheel gearing.

Figure 9:
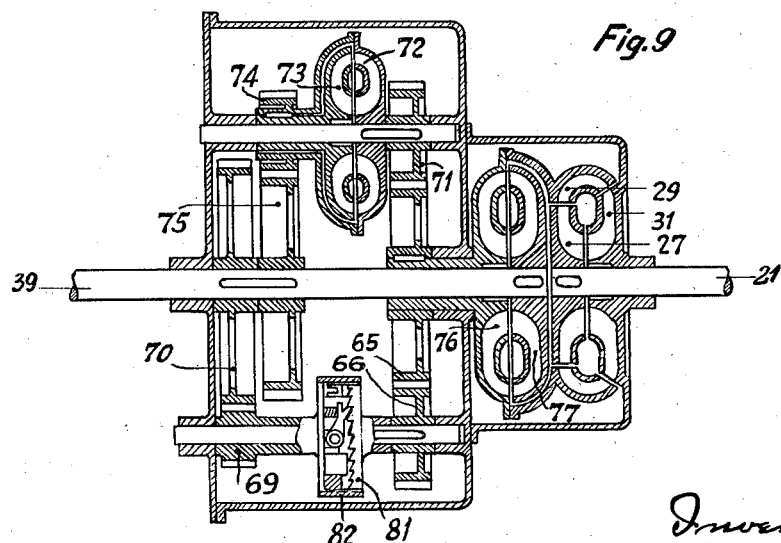
Figure 10:
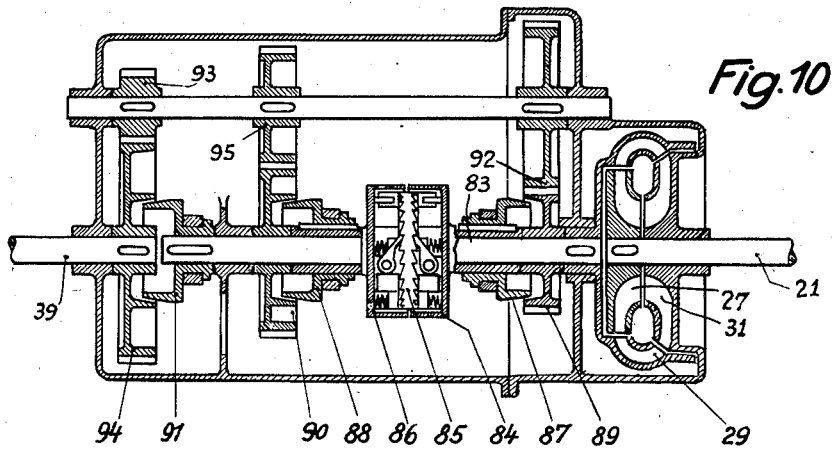

Figure 9 (midsection) shows another modification of the scheme of Figure 7. With the exception of the first gear coupling 67, 68 of Figure 7, the present gear is exactly the same. The Föttinger coupling is here replaced by a known free wheel clutch 81, 82. For starting only the torque increasing transformer 27, 29, 31 is filled. Through the wheels 65, 66 it drives the free wheel half clutch 81 which engages the other half 82 and thus drives the shaft 39 through wheels 69, 70. If now the next gear 74, 75 is engaged by filling the Föttinger coupling 72, 73 the wheel 69 with the half clutch 82 runs faster than the wheel 66 with the half clutch 81, that is the free wheel overruns. The overrun is still greater when the coupling 76, 77 is filled for the third gear.

The highest possible efficiency of power transmission in accordance with the ideas of the present invention is obtained by the combination of a Föttinger transformer with stationary vanes, with a purely mechanically controlled toothed wheel change speed gear. With light vehicles the changes of speed can simply be effected by axial movement of the toothed wheels, as is usual in motor vehicles. The yielding connection between motor and gearing afforded by the Föttinger transformer facilitates manipulation, as declutching is omitted. For vehicles of higher powers, gears with constantly meshed wheels must be used, in which the changes are effected in known manner by friction or dog clutches with or without synchronizing friction clutches. Such as mechanically operated toothed wheel change speed gear with a Föttinger transformer with stationary vanes in advance, is shown for example in Figure 10 (mid-section). As in the above described embodiments, the motor driven shaft 21 carries the primary wheel 27, of the Föttinger transformer 27, 29, 31 of which the turbine wheel 29 is fast on the counter shaft 83, as is also the toothed disc 85 of a double free wheel clutch, 84, 85, 86. The free wheel halves 84 and 86, on which the clutch parts 87 and 88 respectively are slidably keyed, are loose on the counter shaft 83 as are also the toothed wheels 89 and 90, while the clutch part 91 is slidably keyed thereon. The transformer 27, 29, 31 can remain filled because with all clutches 87, 88, 91 disengaged no motion is transmitted. Upon engaging clutch 87 the wheel 89 is driven through the free wheel clutch 84, 85 and the first speed is obtained through the train 92, 93, 94. To obtain a higher speed of travel, the clutch 88 is engaged when the wheel 90 is driven through the free wheel clutch 85, 86 and second gear is obtained through the train 95, 93, 94. The clutch 87 remains engaged and as will readily be seen when the clutch 88 is engaged the wheel 89 overtakes the shaft 83 and the free wheel clutch 84, 85 overruns. The same applies to the free wheel clutch 85, 86 when the clutch 91 is engaged to give direct gear. The change of gear in this example accordingly proceeds very simply and without interruption in the intransmission of power at the moment of change. Naturally, here also as in Figure 8, a device can be provided which enables the motor and toothed wheel change speed gear to be connected either through a transformer with stationary guide vanes or through a hydraulic coupling without stationary vanes.

The technically highly undesirable feature of nearly all toothed wheel change speed gears of interruption of the power transmission at the moment of change of gear involves a further disadvantage when they are combined with a Föttinger transformer with stationary vanes, namely that the turbine wheel and the masses coupled thereto undergo an undesirable increase in speed owing to the temporary unloading of these parts when the power transmission is interrupted. This phenomenon can be lessened by rapid gear changing but this is not easy with many constructions of gear. Further the speed of the motor can be reduced before the commencement of changing by throttling the fuel supply so that during the change the pump wheel of the transformer runs at reduced speed; changing is naturally made more complicated in this way. The most certain way in such cases is to limit the speed of the secondary wheel and the gear parts coupled thereto by an automatic device, for example by a centrifugal brake.

The embodiment of the present invention shown in Figure 11 includes such a device in the form of free wheel clutches interposed at a suitable point between the primary and secondary shafts of the Föttinger transformers, which make it impossible for the secondary part to overrun the primary part, so that during the unloading occurring when the gear is being changed the speed of the secondary shaft cannot exceed that of the primary shaft. This example further allows direct reversal of travel. The motor driven shaft 21 carries a bevel wheel 96 meshing with two bevel wheels 97 and 98 which accordingly rotate in opposite directions. These wheels are rigid with respective hollow shafts 99 and 100 upon which the pump or primary wheels 101 and 102 are respectively fast and which are themselves free on the shaft 107 carrying the secondary wheels 103 and 104. The stationary guide vane parts 105 and 106 are fixed to the casing 130. On the secondary shaft 107 there are also fast pinions 108 and 109 respectively meshing with wheel 110 and 111. These with their respective hollow shafts 112 and 113 and the clutch parts 114 and 115 thereon are free on a counter shaft 119. A sleeve 118 carrying the cooperating clutch parts 116 and 117 is slidably keyed on the shaft 119 and can couple either the wheel 110 or the wheel 111 to the shaft. The torque exerted on the counter shaft is transmitted to the vehicle axles in known manner by coupling rods 120 and 121. The mode of operation of this transmission gear is as follows. The oppositely rotating transformers 101, 103, 105 and 102, 104, 106, the speed of which is preferably made relatively high to obtain convenient dimensions and weight, enable the secondary shaft 107 and therefore the counter shaft 119 to be driven in either direction according to which transformer is filled. Reversal here takes place entirely without shock just as in steam, electric or Diesel electric or the like, propulsion, which cannot be attained in the same degree with toothed wheel reverse gears which must be assumed to be interposed in all the earlier embodiments illustrated herein either between the Föttinger transformer and the change speed gear or behind the change speed gear. By engaging clutch 115, 117 or 114, 116 starting and hill climbing, or running gear respectively is obtained between secondary shaft 107 and counter shaft 119 through wheels 109, 111 or 108, 110. If unloading of the secondary shaft occurs during reversal through both clutch 115, 117 and clutch 114, 116 being momentarily disengaged, free wheel clutches between the wheels 97, and 98 and the shaft 107 indicated diagrammatically at 122, 123 respectively, prevent the shaft overrunning the shafts 99, 100. The simple counter-shaft 119 shown in Figure 11 can naturally be made a hollow shaft surrounding one of the vehicle axles and connected to it in known manner by a yielding coupling.

The shaft 119 could equally well be one of the actual axles of the vehicle, in which case a semi-sprung mounting of the shaft 107 would be used.

Such a semi-sprung mounting is shown together with some further changes in Figures 12 (vertical section) and 13 (horizontal mid-section). The shaft 21 driven from the motor through universal joints drives an intermediate shaft 124 (preferably at a higher speed) through toothed wheels 22 and 23.

In order to show how complete a transmission gear can be developed on the basis of the invention, here both axles of a truck are provided with change speed gear; the two speed gear on the axle 125 serves for forward travel, that on axle 126 for backward travel. In this case only one of the four Föttinger transformers works at a time but both axles 125 and 126 can work as driving axles if they are connected in known manner by crank pins out of phase on the respective sides and coupling rods 120 and 121. The details of the arrangement and its mode of operation are as follows:

For forward travel the counter shaft 129 is driven from the motor driven shaft 124 through the wheel pair 127, 128. The shaft 129 is borne in the casing 130 which is semi-sprung in known manner, being supported at one end 131 on the axle 125 and at the other by lugs 132 connected by the spring suspension 133 in the sprung truck frame 134. The axle 125 sprung in known manner with respect to the truck frame 134 can thus move freely in all directions except the direction of travel, without affecting the parallelism and spacing of the shaft 129 and axle 125. Accordingly the two wheel pairs 135 and 136 and 137, 138 can work correctly. For the starting gear the Föttinger transformer 139, 140, 141 is filled so that its secondary part 140 drives the axle 125 through the wheels 135, 136 and the axle 126 is also driven through the coupling rods 120, 121. In second gear the transformer 142, 143, 144 is filled so that its secondary part 143 drives the axle 125 through the wheels 137, 138.

For backward travel both the transformers on the axle 125 are emptied. In the backward direction, the transformer 145, 146, 147 and wheels 148, 149 serve for starting and the transformer 150, 151, 152 and wheels 153, 154 for full speed. The primary wheels 145 and 150 of the backward transformers and those 139 and 142 of the forward transformers are mounted upon hollow shafts 155 and 156 respectively, which carry bevel wheels 157 and 158 respectively. The driving bevel 158 of the backward gear is on a shaft 159 which is driven from the shaft 124 through a shaft 160 with universal joints.

The transformers in this example also can run at high speed and therefore be small, light and cheap. Controllability of such a construction is of a very high order both during travel and in reversing since it is merely necessary to fill and empty the various Föttinger transformers alternately.

Reverting to the construction shown in Fig. 8, it will be apparent that the separate coupling 76, 77 may be omitted when the guide vanes 31 of the transformer are movable axially, as illustrated in Figs. 14 and 15, to permit operation of the movable elements 27, 29 either as a transformer or as a simple hydraulic coupling. The guide vanes 31 may be mounted on a ring 161 which is axially adjustable by lever 162 to position the vanes between the rotating elements, as in Fig. 14, for transformer operation or to move the guide vanes out of the hydraulic circuit, as in Fig. 15, for simple coupling or clutch operation.

I claim:—

1. A multiple speed gearing comprising a driving shaft, a driven shaft, a Föttinger hydraulic transformer drive including stationary guide vanes and a pair of movable vane wheels, means securing the primary wheel to the driving shaft and the secondary wheel to the driven shaft, and an alternative driving train coupling said shafts, said driving train including a gear train in series with a second Föttinger transformer.

2. A multispeed transmission mechanism for effecting a substantially continuous variation of the torque and speed of a driven shaft actuated by a driving shaft of approximately constant torque and speed, said transmission mechanism comprising a driving shaft, a driven shaft, a plurality of mechanical gear trains of different transmission ratios connected to the driven shaft for selective inclusion in the power-transmitting path between said shafts in accordance with the desired torque and speed to be developed at the driven shaft, and torque-equalizing means included in the power-transmitting path for decreasing the torque at the driven shaft with increasing speed and for substantially equalizing the torque developed at the driven shaft by a pair of mechanical gear trains of adjacent transmission ratios when the driven shaft is rotated at a speed appropriate for a transfer from operation through one of the said pair of gear trains to operation through the other; said torque-equalizing means comprising, in combination, at least one Föttinger hydraulic transformer drive of the type including stationary guide means cooperating with a primary turbine wheel and a secondary turbine wheel, means for actuating the primary turbine wheel from the driving shaft, and means connected to the secondary wheel for actuating the selected mechanical gear train to operate the driven shaft.

3. A multispeed transmission mechanism as claimed in claim 2, wherein the direction of fluid flow in the hydraulic transformer is from the primary wheel to the secondary wheel and then through the guide vanes back to the primary wheel.

4. A multiple speed transmission mechanism as claimed in claim 2, wherein one of said mechanical gear trains comprises a plurality of sets of meshing gear wheels and clutch means for alternatively including a desired set of said gear wheels in the power-transmitting path.

5. A multiple speed gearing for effecting a substantially continuous variation of the torque and speed of a driven shaft actuated from a driving shaft of approximately constant torque and speed, said mechanism comprising a Föttinger hydraulic transformer including stationary guide means cooperating with a primary turbine wheel and a secondary turbine wheel, means for operating the primary turbine wheel from the driving shaft, means for actuating the driven shaft from the secondary wheel, and an alternative driving train for coupling said driving and driven shafts, said driving train including a gear train in series with a second Föttinger transformer.

6. A multiple speed transmission gearing as claimed in claim 5, wherein the means for actuating the driven shaft from the secondary turbine wheel of the first Föttinger transformer includes a gear train having a transmission ratio substantially different from the transmission ratio of the gear train of said alternative driving train.

7. A multiple speed transmission for effecting a continuous variation of torque with speed over an extended speed range of a driven shaft, said transmission comprising the combination with a driving shaft operating at approximately constant speed and torque, and a driven shaft for developing a torque which decreases as a continuous function of the speed of the driven shaft, of means including a plurality of alternatively operable driving trains between said driven and driving shaft for obtaining a continuous variation of torque with speed over an extended speed range of the driven shaft; each driving train including a Föttinger hydraulic torque transformer having a high transmission efficiency over a range of transmission ratios, and a mechanical gear train, the gear trains of the respective driving trains having different transmission ratios which determine the speed range of the several driving trains, and the Föttinger transformers acting to equalize the torque developed at the driven shaft when the driven shaft is being rotated by either of two driving trains at a speed appropriate for a change from one of the said driving trains to the other.

8. A multiple speed transmission gearing as claimed in claim 7, wherein a speed-increasing mechanical gear train is positioned between certain of the Föttinger transformers and said driving shaft, whereby the size of the said certain transformers is substantially less than the size required when the driving shaft is directly connected to the primary wheels of the said certain transformers.

9. A multiple speed gearing comprising a driving shaft, a driven shaft, and means including at least one Föttinger hydraulic transformer and a plurality of mechanical gear trains for selectively establishing the desired one of a plurality of driving connections between said shafts, each of said gear trains including a gear secured to the said driven shaft and another gear coupled to said driving shaft through a Föttinger hydraulic transformer.

10. A multispeed gearing as claimed in claim 9, wherein there are a plurality of said transformers, the primary wheel of one transformer being secured to the driving shaft and the secondary wheel thereof being secured to the driven shaft.

11. A multispeed gearing comprising a driving shaft, a driven shaft, a Föttinger hydraulic transformer including stationary guide vanes and a pair of movable vane wheels, means for securing the primary wheel to the driving shaft and the secondary wheel to the driven shaft, and a plurality of additional driving trains for coupling said shafts, each of said driving trains including a mechanical gear train connected to the driven shaft and a Föttinger torque transformer coupled to the driving shaft.

12. A multispeed gearing as claimed in claim 11, wherein said gear trains have a common gear secured to the driven shaft, and each gear train includes a gear meshing with said common gear.

13. A multispeed gearing as claimed in claim 11, wherein each gear train includes a driven gear secured to the driven shaft.

14. A multispeed gearing as claimed in claim 11, wherein a pair of said additional driving trains have a common Föttinger torque transformer, each of said pair of driving trains including a driven gear secured to the driven shaft, a driving gear in mesh with said driven gear, and clutch means for selectively coupling the driving gear of one of said driving trains to the driving shaft through the common torque transformer.

CURT STEDEFELD.